No. 656,602. Patented Aug. 21, 1900.
J. R. FARMER.
DOUGH MIXING MACHINE.
(Application filed Mar. 6, 1900.)
(No Model.)
Fig. I.
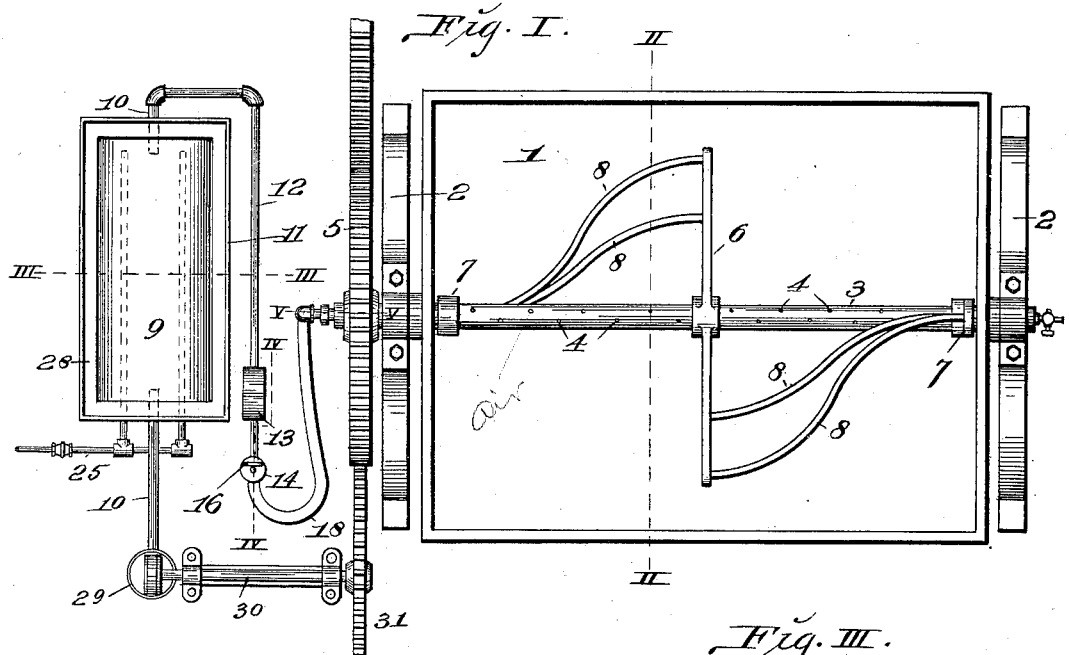
Fig. II.
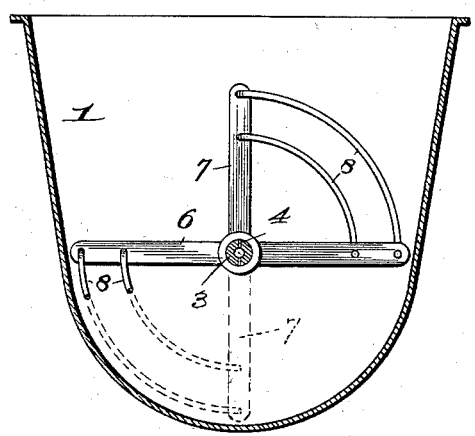
Fig. III.
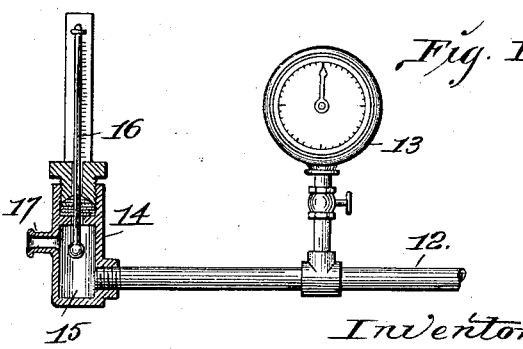
Fig. V.
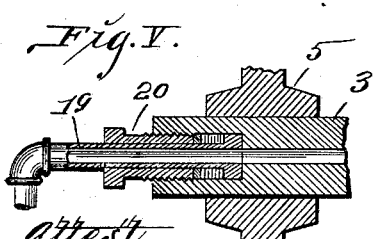
Attest
M. P. Smith
E. S. Knight
Inventor:—
John R. Farmer:—
By Wright Bros
Atty's
THE NORRIS PETERS CO., PHOTO-LITHO., WASHINGTON, D. C.

UNITED STATES PATENT OFFICE.

JOHN R. FARMER, OF ST. LOUIS, MISSOURI, ASSIGNOR OF TWO-THIRDS TO ADOLPH BOETTLER AND HENRY F. W. RUHE, OF SAME PLACE.

DOUGH-MIXING MACHINE.

SPECIFICATION forming part of Letters Patent No. 656,602, dated August 21, 1900.

Application filed March 6, 1900. Serial No. 7,609. (No model.)

*To all whom it may concern:*

Be it known that I, JOHN R. FARMER, a citizen of the United States, residing at the city of St. Louis, in the State of Missouri, have invented certain new and useful Improvements in Dough-Mixing Machines, of which the following is a full, clear, and exact description, reference being had to the accompanying drawings, forming part of this specification.

My invention relates to machines for mixing or kneading bread-dough, and has for its object the construction of a machine of such character that the dough may be thoroughly mixed and beaten and at the same time be aerated by injecting air thereinto for the purpose of producing a perfect commingling of the dough ingredients and rendering the dough of superior quality.

My invention consists in features of novelty hereinafter fully described, and pointed out in the claims.

Figure I is a top or plan view of my improved dough-mixing machine. Fig. II is a vertical cross-sectional view taken on the line II II, Fig. I. Fig. III is a vertical cross-sectional view taken on the line III III, Fig. I, through the convertible air heater or cooler. Fig. IV is an enlarged detail view of a part of the air-conducting pipe and the gage and thermometer applied thereto, partly in section, taken on the line IV IV, Fig. I. Fig. V is an enlarged detail sectional view through the stuffing-box connection between the beater-shaft and air-pipe, taken on the line V V, Fig. I.

1 designates the dough-pan, and 2 standards by which said pan is supported.

3 designates a tubular shaft mounted in journal-bearings on the standards 2 and provided with a plurality of perforations 4 on the part thereof located within the dough-pan. The shaft is operated by power applied to the gearing 5. Centrally located on the shaft 3 within the dough-pan is a cross-bar 6, and on the shaft, near the ends of the pan, are arms 7, that extend at right angles to the arms of the cross-bar 6.

8 represents beater-rods fixed to the arms of the cross-bar 6 and bent into compound curves to form beaters, by which the dough is worked or kneaded as the shaft 3 is revolved.

9 designates an air-box that is supplied with air under pressure from a conducting-pipe 10, that leads thereinto. The air-box 9 is surrounded by a jacket 11, reference to the interior construction of which will be hereinafter made.

Leading from the air-box 9 is an outlet air-pipe 12, that is equipped with a gage 13 for indicating the pressure under which the air is conveyed through said pipe. Connected to the air-pipe 12 is a chamber-housing 14, containing a chamber 15, that receives the lower end of a thermometer 16, designed to indicate the temperature of the air flowing through the pipe 12. The chamber-housing 14 is provided with a nipple 17, to which is connected one end of a flexible tube 18, the opposite end of the tube being joined to a short pipe 19, that is seated in the end of the hollow shaft 3 and is secured by a stuffing-box gland 20. (See Fig. V.)

In the operation of the machine the shaft 3 is revolved through the dough in the dough-pan to turn the beaters therein, and at the same time the air is forced through the air-box 9 from the pipe 10 and passes from said box through the pipe 12 and flexible tube 18 into the hollow shaft to be delivered into the dough through the perforations 4 in said shaft, so that while the dough is being beaten by the beater-rods 8, cutting paths therein, the air is constantly forced into the dough throughout the mass, thoroughly aerating it.

In cold weather it is necessary that the air injected into the dough be heated to produce the proper temperature thereof, by which the best results may be obtained, and to this end I have provided a heating apparatus by which the air may be heated as it passes through the air-box 9. Extending across the jacket 11, that surrounds the air-box, is a partition 21, (see Fig. III,) that with the coincident portions of the jacket-walls incloses a hot-air chamber 22. Located in the hot-air chamber 22 are gas-burners 23, provided with jets 24. The gas-burners 23 are supplied from a gas-conducting pipe 25, that leads from a suitable source of gas-supply. By the use of the gas-burners heat may be supplied within the hot-air chamber 22 to radiate therefrom to the air-box 9 and heat the air as it passes through said box to the dough-mixer.

In warm weather it is necessary to reduce the temperature of the air to a proper degree, and to accomplish such reduction I provide an ice-chamber 26 above the air-box, that is closed by a door 27, hinged to the jacket-wall. 28 is a shelf located at the bottom of the ice-chamber and surrounding the upper part of the air-box to prevent the ice from falling into the lower part of the jacket 11. By placing the proper amount of ice in the ice-box 26 the air-box may be cooled to the desired temperature previous to passing to the dough-mixer.

The air fed to the air-box 9 is compressed in a pump 29, (see Fig. I,) the pump being operated by a shaft 30, having connection therewith. The shaft 30 has fixed to it a gear-wheel 31, the teeth of which mesh with the teeth of the gearing 5. By this arrangement the pump 29 is operated continuously during the operation of the dough-mixing mechanism, whereby a constant pressure of air is produced commensurate with the quantity of air desired to be injected into the dough being mixed.

I claim as my invention—

1. In a dough-mixing machine, the combination of a dough-pan, a hollow perforated shaft arranged therein, beaters carried by said shaft, means for operating the shaft, means for supplying air to said shaft to be ejected therefrom into the dough-pan, and means for heating said air, substantially as described.

2. In a dough-mixing machine, the combination of a dough-pan, a hollow perforated shaft arranged in said pan, beaters carried thereby, means for operating said shaft, an air-box, a jacket surrounding said air-box, a hot-air chamber within said jacket, a burner in said hot-air chamber, and an air-conducting pipe leading from said air-box to said hollow shaft, substantially as described.

3. In a dough-mixing machine, the combination of a dough-pan, a hollow perforated beater-shaft arranged to operate in said pan, means for driving said shaft, means for conveying air to the interior of said shaft, and an air-pump having driving connection with said shaft-operating means, substantially as described.

JOHN R. FARMER.

In presence of—
  E. S. KNIGHT,
  N. V. ALEXANDER.